(12) United States Patent
Aoki et al.

(10) Patent No.: US 7,325,937 B2
(45) Date of Patent: Feb. 5, 2008

(54) LIGHTING DEVICE FOR DISPLAY DEVICE AND DISPLAY DEVICE

(75) Inventors: Ketaroh Aoki, Katsushika-ku (JP); Motoaki Okitsu, Tsu (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 11/557,345

(22) Filed: Nov. 7, 2006

(65) Prior Publication Data

US 2007/0058397 A1    Mar. 15, 2007

Related U.S. Application Data

(63) Continuation of application No. PCT/JP2005/015939, filed on Aug. 31, 2005.

(30) Foreign Application Priority Data

Nov. 30, 2004 (JP) .............................. 2004-347327

(51) Int. Cl.
*G09F 12/04* (2006.01)
*F21V 19/00* (2006.01)
*G02F 1/13357* (2006.01)

(52) U.S. Cl. .......................... 362/97; 362/225; 349/60; 349/58

(58) Field of Classification Search ........ 362/632–634, 362/97, 225; 349/58–60, 64, 70
See application file for complete search history.

(56) References Cited

U.S. PATENT DOCUMENTS 4,870,484 A * 9/1989 Sonehara ..................... 348/791

6,722,773 B2 * 4/2004 Tsai et al. ..................... 362/216
7,059,736 B2 * 6/2006 Yu et al. ........................ 362/97
2004/0156183 A1 * 8/2004 Kim ............................. 362/31
2005/0270803 A1 * 12/2005 Tsai et al. ..................... 362/632

FOREIGN PATENT DOCUMENTS

| JP | 05-67021 U | 9/1993 |
| JP | 11-329040 A | 11/1999 |
| JP | 48-102466 U | 8/2001 |
| JP | 2001-210126 A | 8/2001 |
| JP | 2004-022287 A | 1/2004 |
| JP | 2004-158224 A | 6/2004 |
| JP | 2004-158324 A | 6/2004 |

OTHER PUBLICATIONS

International Search Report issued in corresponding International Application No. PCT/JP2005/015939, mailed on Nov. 22, 2005.

(Continued)

*Primary Examiner*—Alan Cariaso
*Assistant Examiner*—Robert J. May
(74) *Attorney, Agent, or Firm*—Keating & Bennett, LLP

(57) ABSTRACT

In a lighting device for a display device, a clearance is set between an edge portion of a locking piece in a lamp clip, and a hole edge of a locking piece insertion hole provided at a back plate part of the case to correspond to the locking piece, and thereby, relative displacement of the locking piece in the locking piece insertion hole is allowed. According to such a construction, expansion and contraction deformation of the lamp clip accompanying temperature change and a variation in molding accuracy can be absorbed, and therefore, poor assembly of the lamp clip to the case can be avoided.

18 Claims, 15 Drawing Sheets

OTHER PUBLICATIONS

International Search Report issued in the corresponding International Application No. PCT/JP2005/015939, mailed on Nov. 22, 2005.

Official communication issued in the counterpart Japanese Application No. 2006-520459, mailed on Feb. 27, 2007.

Official communication issued in the counterpart Japanese Application No. 2006-520459, mailed on Nov. 28, 2006.

Yoshiki Takata et al.; "Lamp Holding Apparatus, Backlight Device for Display Device Including Same, Display Device Including Same and Liquid Crystal Display Divice Including Backlight Device for Display Divice"; U.S. Appl. No. 11/560,272, filed Nov. 28, 2006.

Hiroki Azuma et al.; "Lamp Holding Apparatus, Lighting Device for Display Device Including Same, Display Device Including Same and Liquid Crystal Display Device Including Lighting Device for Display Divice"; U.S. Appl. No. 11/560,259, filed Nov. 15, 2006.

Yoshiki Takata et al.; "Lamp Holder Backlight Device Using the Same, and Display Using the Same"; U.S. Appl. No. 11/720,175, filed May 24, 2007.

Kentaroh Aoki et al.; "Illuminating Apparatus for Displaying Apparatus and Displaying Apparatus"; U.S. Appl. No. 11/719,612, filed May 17, 2007.

* cited by examiner

LIGHTING DEVICE FOR DISPLAY DEVICE AND DISPLAY DEVICE

CROSS REFERENCE TO RELATED APPLICATION

This application is a Continuation of International Application PCT/JP2005/015939, with an international filing date of Aug. 31, 2005, still pending. In addition, this application claims priority from Japanese Patent Application No. 2004-347327 filed Nov. 30, 2004, the entire contents of which are hereby incorporated herein by reference.

BACKGROUND OF THE INVENTION

1. Field of the Invention

The present invention relates to a lighting device for a display device and a display device including such a lighting device.

2. Description of the Related Art

In a non-luminous display device such as a liquid display device, a backlight unit is provided at a back surface of a panel for illumination of the panel. The backlight unit includes a plurality of light sources, such as cold-cathode tubes, arranged side by side in a case having a shallow pan shape.

These light sources are fixed to a bottom surface of the case by light source holding elements such as lamp clips formed of a resin or the like. In the lamp clip, an engaging part which engages with the case is provided on a surface at a first side opposed to the case bottom surface, and a clip part that holds the light sources is provided on a surface at a second side opposite from the first side.

Since the inside of the case is at high temperature due to heat from the light sources during the operating time of the display device, the temperature inside the case significantly varies with the repetition of operation and stoppage of the device, and with this temperature variation, the case and the lamp clips expand and contract. Since in this case, the resin lamp clip has a higher coefficient of thermal expansion as compared with the metal case, the case cannot follow the expansion and contraction of the lamp clip, and there is a possibility that the lamp clip is deformed or otherwise distorted. These problems may become more significant as the display devices increase in size.

SUMMARY OF THE INVENTION

In order to overcome the problems described above, preferred embodiments of the present invention provide a lighting device and a display device including a lighting device, that are capable of preventing the problems of deformation of a holding element and the like even when expansion and contraction of the holding element for holding a light source and the case due to temperature change occur.

A lighting device for a display device according to a preferred embodiment of the present invention preferably includes a light source, a casing which has a back plate part and accommodates the light source along the back panel, and a light source holding element that is mounted to the back plate part of the casing and holds the light source. Further, the light source holding element includes a base part extending along the back plate part of the casing, a pair of elastic pieces which are arranged to protrude at the base part and hold the light source to embrace the light source, an engaging part which is arranged to protrude at the base part on a side opposite from the elastic pieces, penetrates through an engaging part insertion hole formed in the back plate part of the casing and engages with the back plate part, and a locking piece which is arranged to protrude at the base part on a side opposite from the elastic pieces, penetrates through a locking piece insertion hole formed in the back plate part of the casing, sandwiches the back plate part with the base part on a back side of the back plate part, and is locked. The locking piece insertion hole of the back plate part is preferably larger than the locking piece, and thereby, clearances are formed between opening edge portions of the locking piece insertion hole and the locking piece. According to such a construction, expansion and contraction accompanying a temperature change and a variation in molding accuracy can be absorbed, and therefore, assembling failure of the light source holding element to the casing, thermal deformation and the like is reliably prevented.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

The disclosure of preferred embodiments of the present invention is described in detail with reference to FIGS. 1 to 9.

Figure 1:
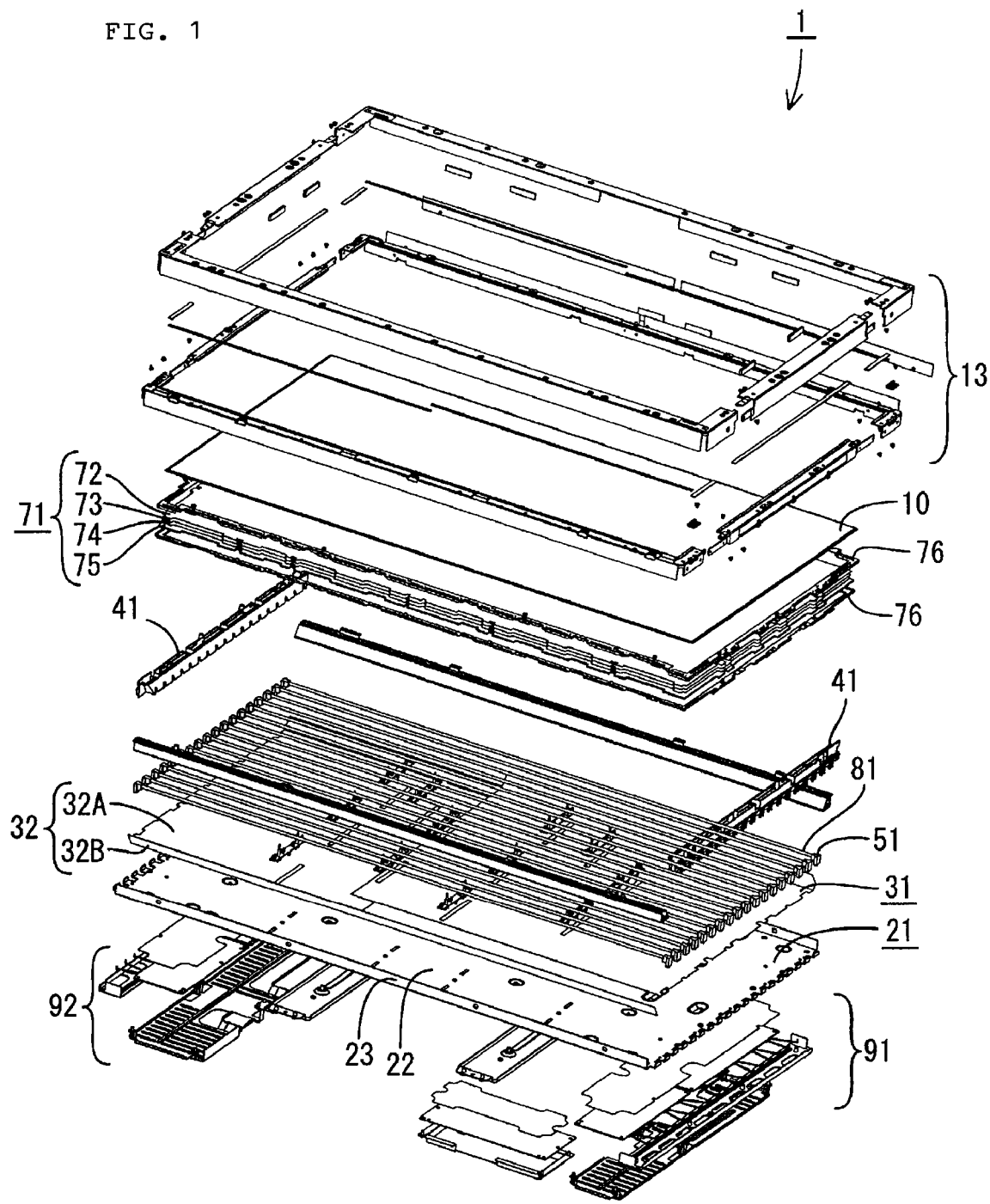
FIG. 1 is an exploded perspective view of a liquid crystal display.
Figure 2:
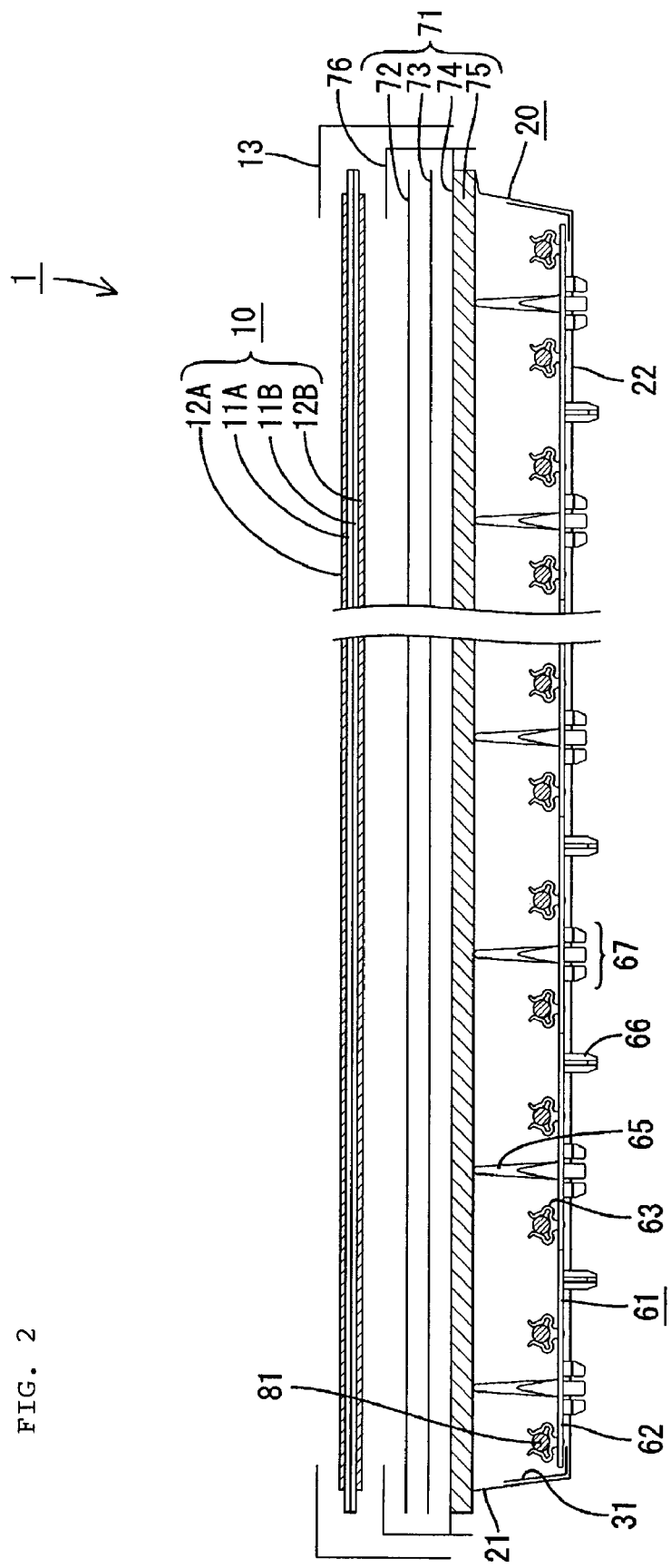
FIG. 2 is a sectional side view of the liquid crystal display.
Figure 3:
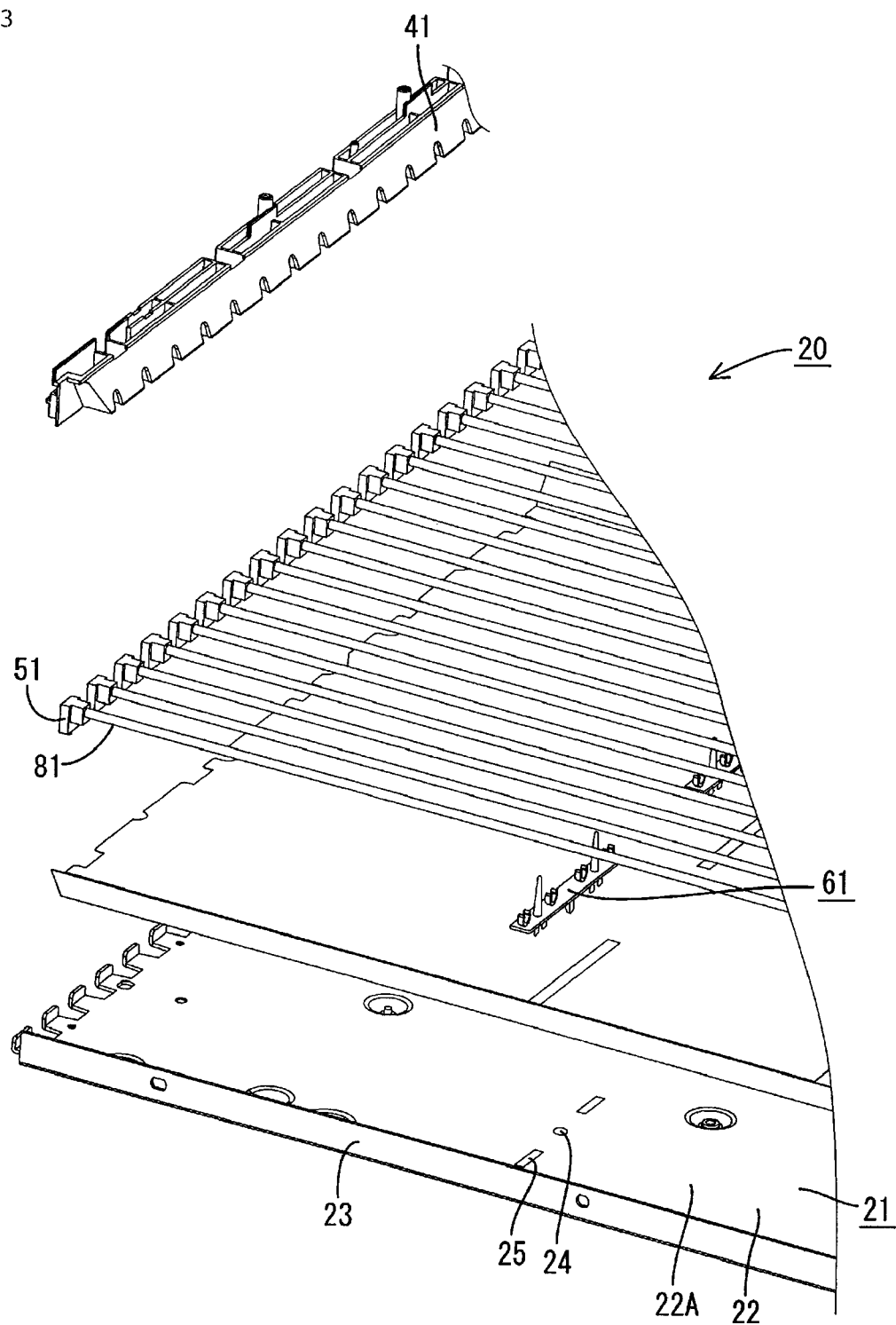
FIG. 3 is a partially enlarged view of a backlight unit.
Figure 4:
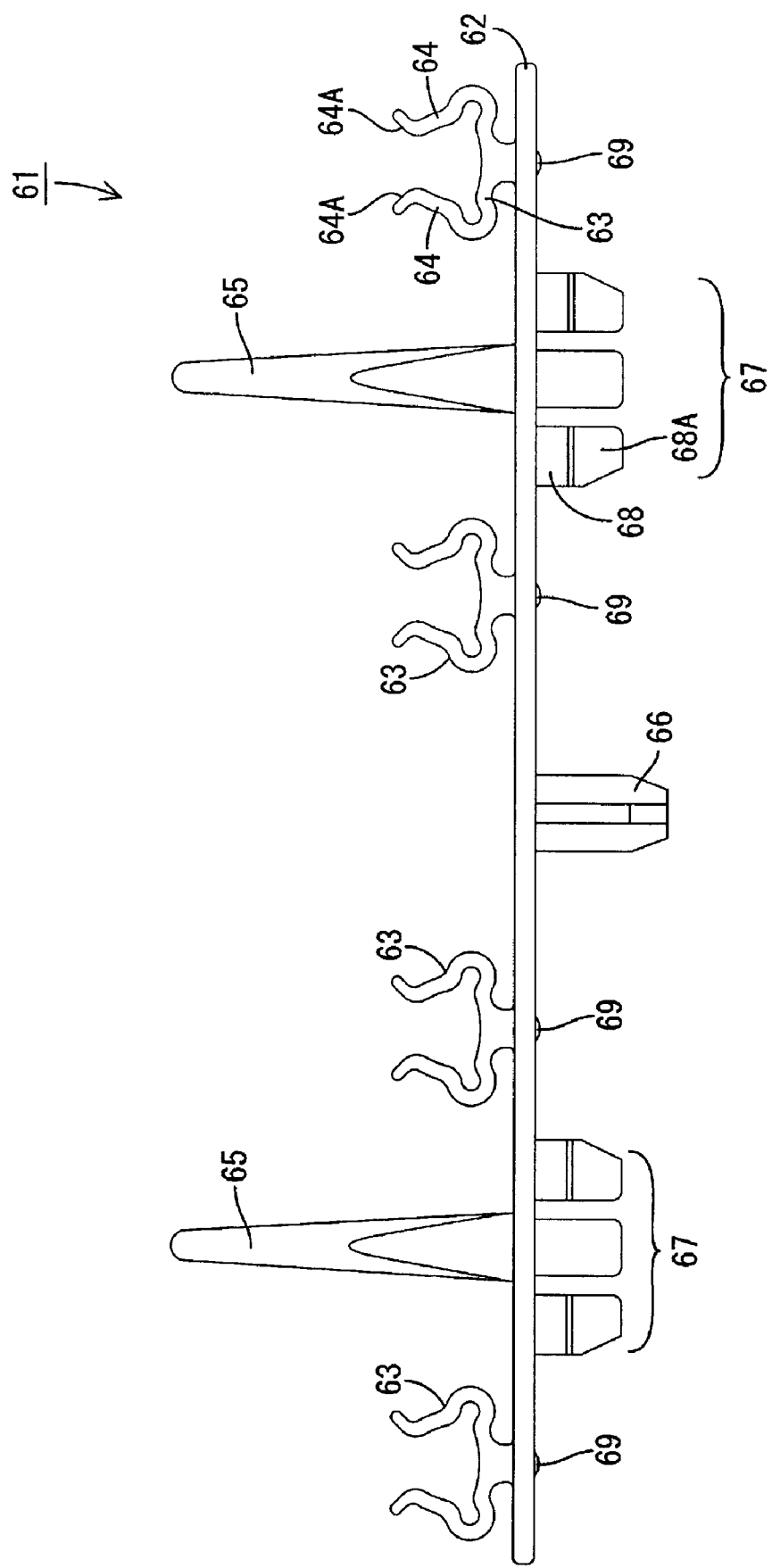
FIG. 4 is a side view of a lamp clip.
Figure 5:
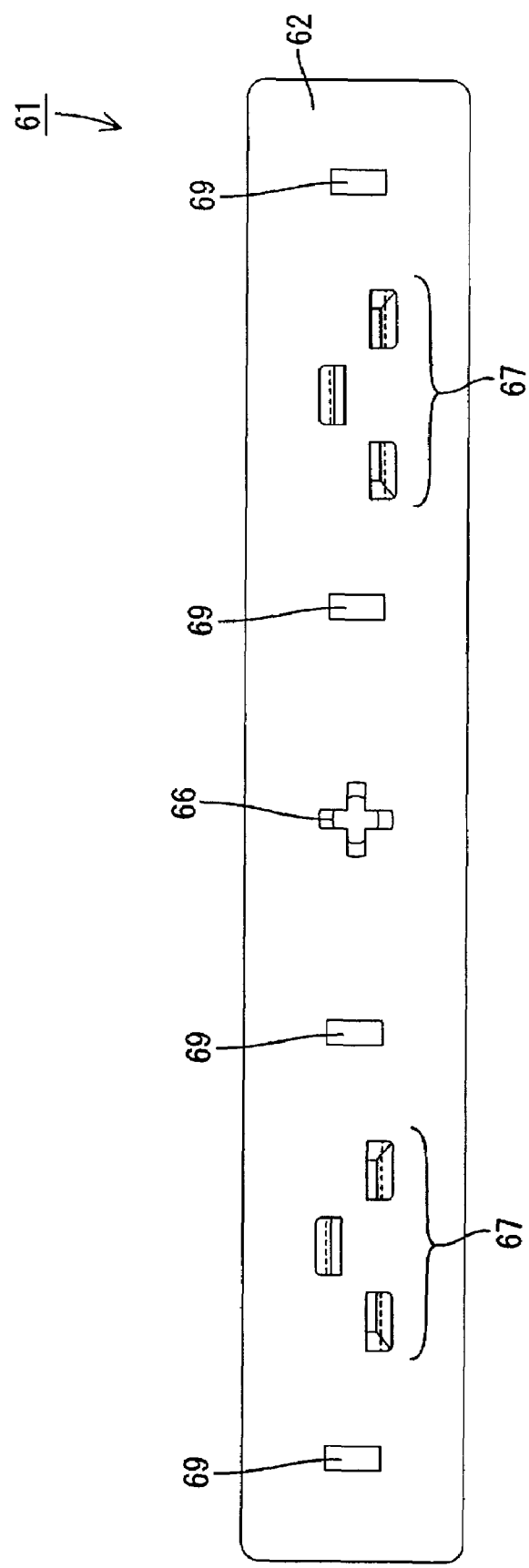
FIG. 5 is a rear view of the lamp clip.
Figure 6:
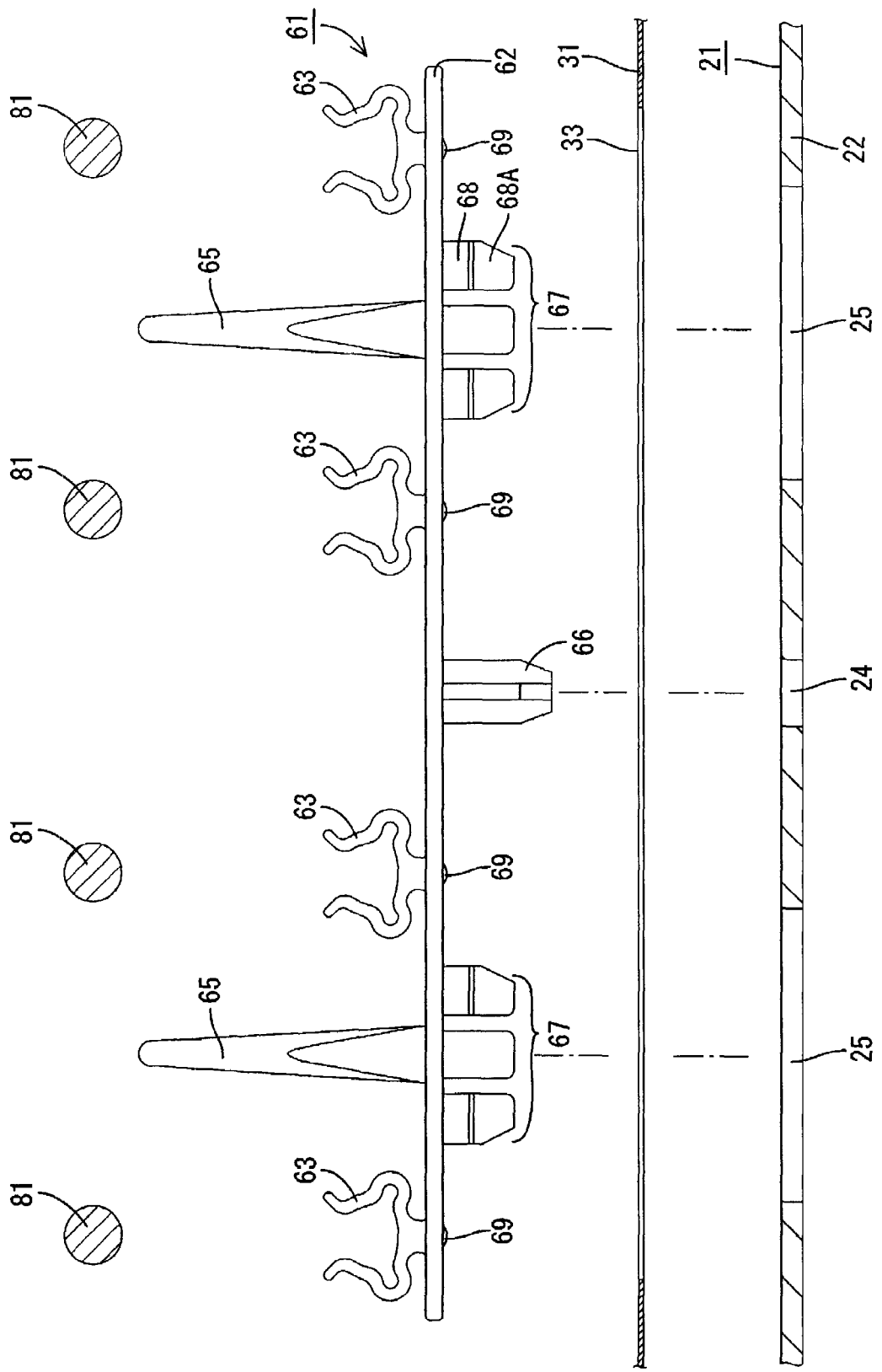
FIG. 6 is a sectional side view showing the lamp clip before being mounted to the case.
Figure 7:
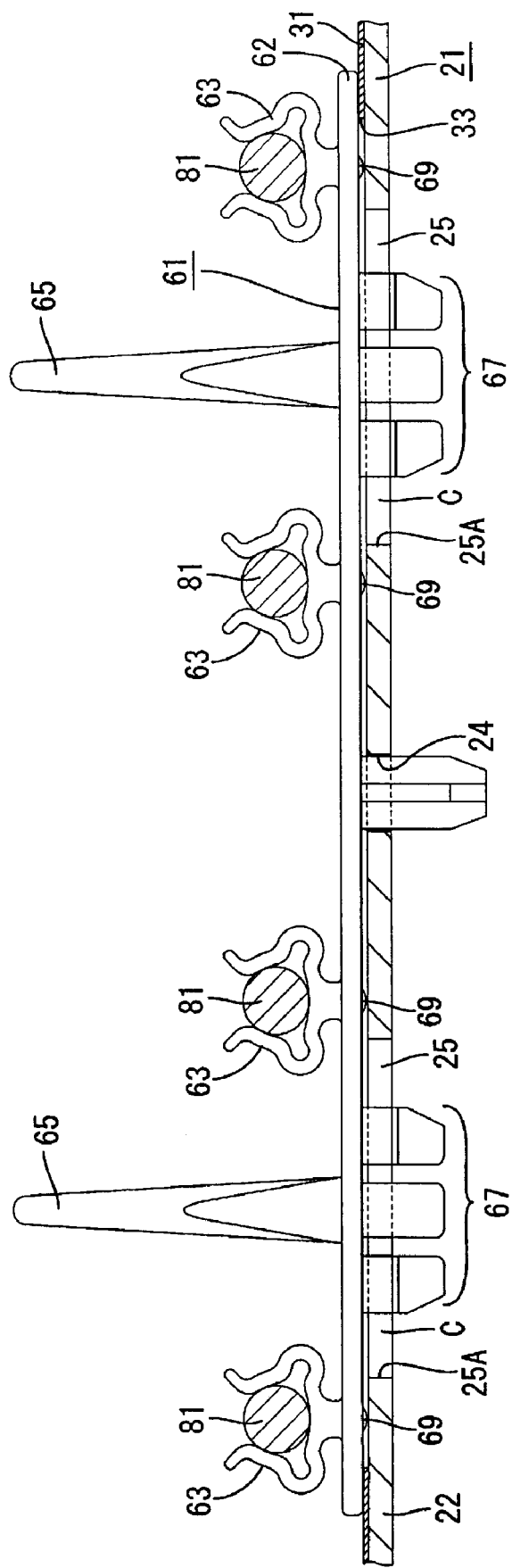
FIG. 7 is a sectional side view showing the lamp clip after being mounted to the case.
Figure 8:
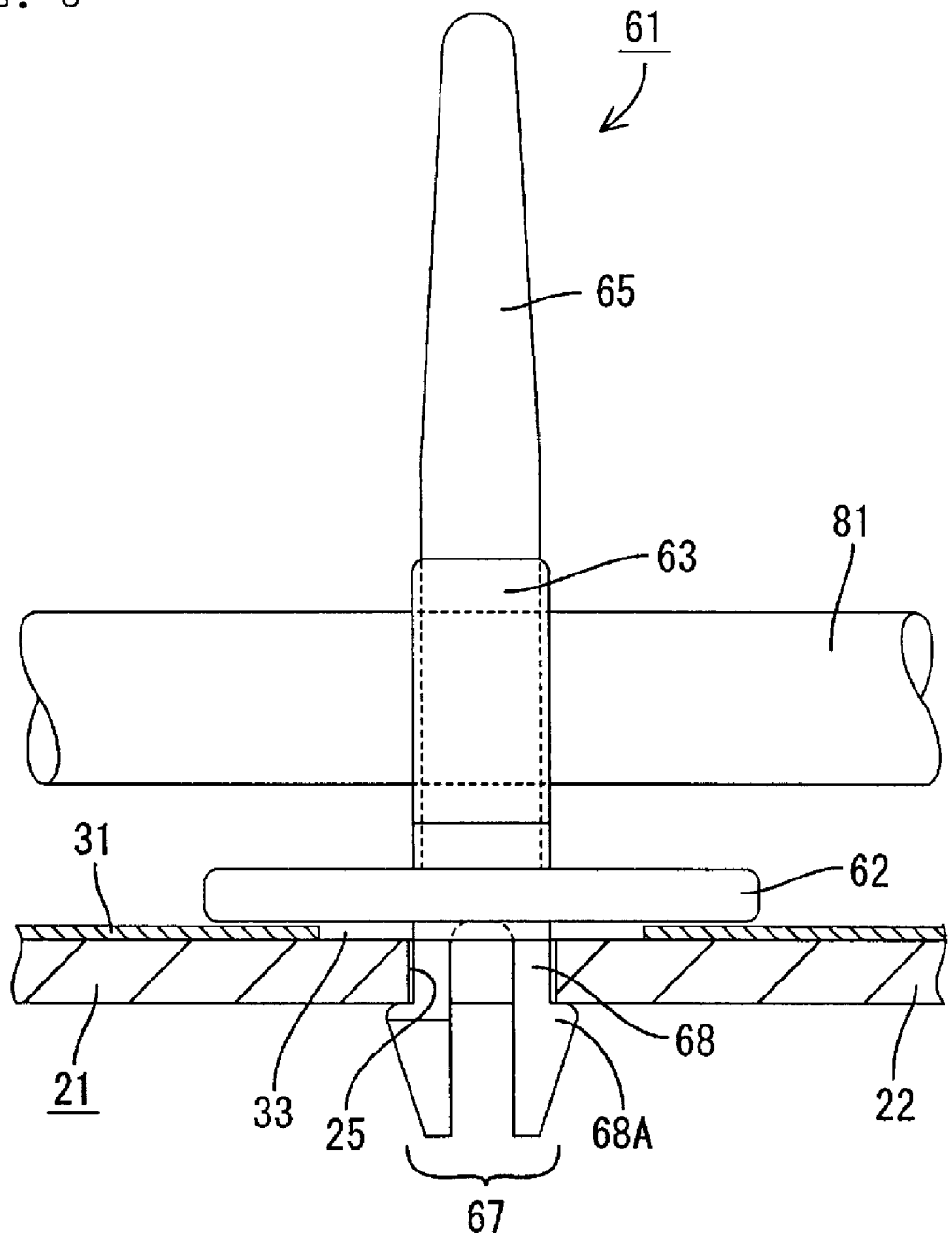
FIG. 8 is a vertical sectional view showing the lamp clip after being mounted to the case.
Figure 9A:
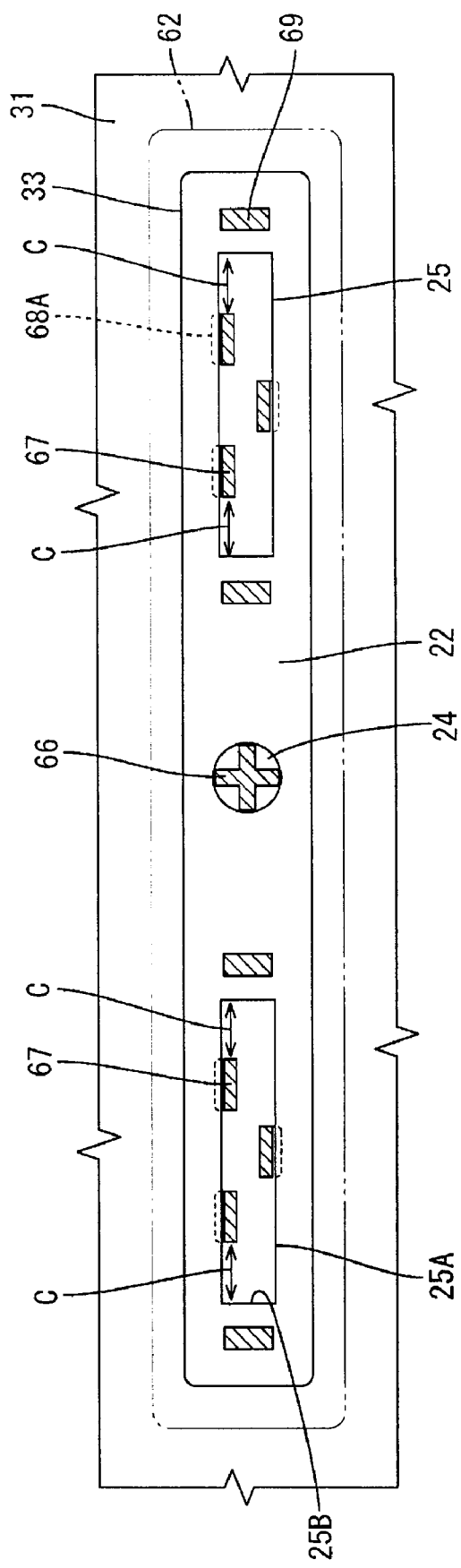
FIG. 9A is a rear view showing a state at a time of contracting deformation of the lamp clip.
Figure 9B:
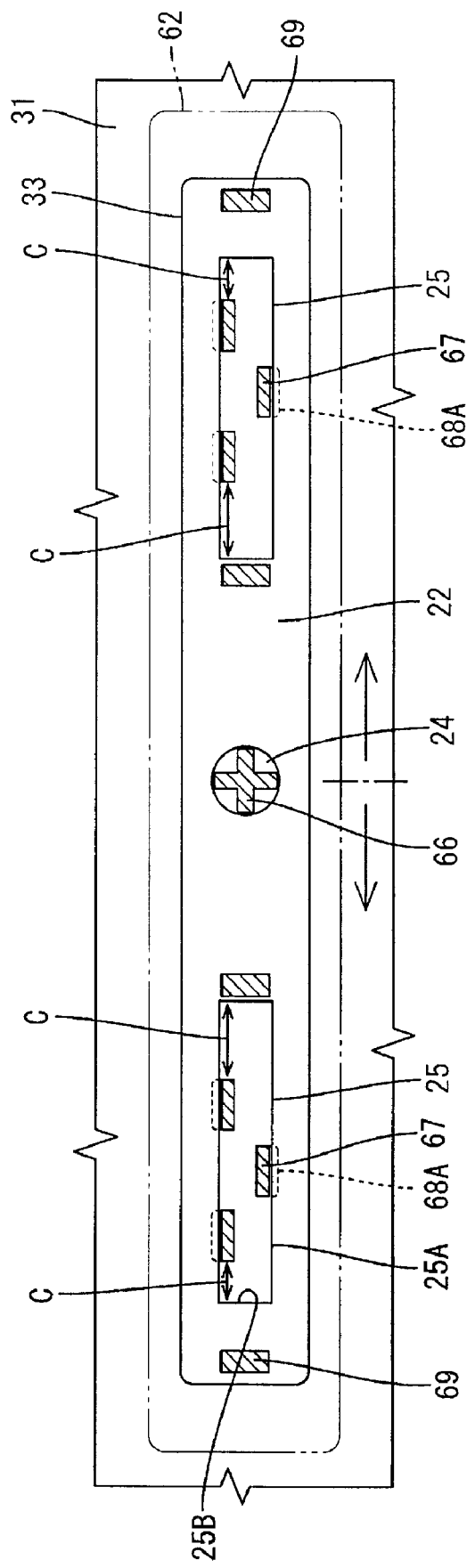
FIG. 9B is a rear view showing a state of an expanding deformation of the lamp clip.

FIG. 1 shows an exploded perspective view of a liquid crystal display 1 corresponding to a display device, and FIG. 2 shows a sectional side view of the liquid crystal display 1. The liquid crystal display 1 includes a liquid crystal panel 10, and a backlight unit 20 defining a lighting device for the display device which is assembled from a back surface side of the liquid crystal panel 10. The liquid crystal panel 10 and the backlight unit are integrally held by a bezel 13.

Although not shown in detail, the liquid crystal panel 10 has a known construction in which a pair of glass sheets 11 preferably having a substantially rectangular plate shape provided with switching elements (for example, TFT elements), pixel electrodes and the like arranged in a matrix configuration are bonded to each other with a predetermined gap therebetween, and liquid crystal is sealed in between both the glass sheets 11A and 11B. On outer side surfaces (surfaces at the sides opposite from the liquid crystal layer) of both the glass sheets 11A and 11B, polarizing plates 12A and 12B which are have substantially the same size as the glass sheets 11A and 11B are respectively stacked.

The backlight unit 20, which is mounted on the back surface side of the liquid crystal panel 10, is preferably a direct type in which a light source is disposed at the back surface of the liquid crystal panel 10, and includes a backlight case 21 (abbreviated as "case 21" hereinafter), a plurality of cool cathode tubes 81 defining a light source accommodated in the case 21, and an optical member 71 mounted to an opening of the case 21.

The case 21 includes a back plate part 22 preferably having a substantially rectangular plate shape and a size that is substantially equal to the liquid crystal panel 10, and side wall parts 23 extending to the front surface side respectively from four sides of the back plate part 22, and defines a substantially shallow pan shape opened at the front surface side.

A reflection sheet 31 for reflecting light from the cool cathode tubes 81 that will be described later is laid inside the case 21. The reflection sheet 31 is preferably a white sheet formed of a synthetic resin, and is provided by combining two separate sheets 32 having substantially the same shape in a staggered configuration. In the respective separate sheets 32, a bottom side sheet piece 32A which is matched with the back plate part 22 of the case 21 is divided into two at a central position in its length direction, and a side wall side sheet piece 32B which is matched with the side wall parts 23 at the length side in the case 21 are joined to the length portions in each of the separate pieces.

A plurality of cool cathode tubes 81 are provided on the reflection sheet 31. The cool cathode tubes 81 each have a slim tube body longer in the long side direction of the case 21, and are arranged side by side along the short side direction of the case 21. Both end portions of the cool cathode tubes 81 are held by rubber holders 51 placed at both short side portions of the case 21, and the cool cathode tubes 81 together with the rubber holders 51 are collectively covered with lamp holders 41. The cool cathode tube 81 is held by a lamp clip 61 which is mounted to the back plate part 22 of the case 21 in a position slightly shifted toward the center from both the end portions (see FIG. 3).

Each of the lamp clips 61 is capable of holding a set of cool cathode tubes 81 in four lines, two lamp clips 61 are provided for each set (four lines) of cooling cathode tubes 81, and the lamp clips 61 which support the adjacent sets of cooling cathode tubes 81 are arranged in a staggered configuration.

The lamp clip 61 includes a base part 62 which forms a slim substantially rectangular plate shape longer along the short side direction of the back plate part 22 (the direction that is substantially perpendicular to the lengthwise direction of the cool cathode tube 81). At the front surface side of the base part 62 (the side opposite from the surface side opposed to the back plate part 22 of the case 21), four clip parts 63 for holding the cool cathode tubes 81 are arranged side by side at equal pitches along the length direction of the base part 62. The clip part 63 includes a pair of elastic pieces 64 capable of extensively opening along the length direction of the base part 62 from each other, and is substantially in the form of a C-shaped ring, part of which opens in a circumferential direction. Guide slope parts 64A, which are bent to open in a direction extending away from each other in order to guide a fitting motion of the cool cathode tube 81 into the clip part 63, are provided at the tip end portions of a pair of elastic pieces 64. When the cool cathode tube 81 is pushed in from the opening of the elastic pieces 64, both the elastic pieces 64 are deformed to extensively open to allow passage of the cool cathode tube 81, and when the cool cathode tube 81 enters the inside, both the elastic pieces 64 elastically return to be elastically in contact with an outer periphery of the cool cathode tube 81, and thereby hold the cool cathode tube 81.

Conical pins 65 tapering in the direction of their tip ends are provided between the outermost clip parts 63 and the clip parts 63 inside thereof among the four clip parts 63. The pin 65 is arranged to extend to the area in the vicinity of the opening of the case 21, and supports the optical member 71 which will be described later from the back surface side.

Further, on the back surface side of the base part 62, namely, on the surface side opposed to an inner wall surface 22A in the back plate part 22 of the case 21, a positioning engagement part 66 and locking pieces 67 are provided. The positioning engagement part 66 positions the lamp clip 61 to the back plate part 22 of the case 21, forms a cross shape when seen from the axial direction, and is arranged to protrude at a central position of the base part 62.

The locking piece 67 is arranged to fix the lamp clip 61 to the back plate part 22, and two sets of the locking pieces 67 each preferably including three pieces are provided at the positions which are at both side portions of the positioning engagement part 66 and correspond to the back surface sides of the pins 65. Three locking pieces 67 which define one set are arranged side by side along the long side direction of the base part 62, and the central locking piece 67 is arranged to be shifted in the short side direction of the base part 62 with respect to both the adjacent locking pieces 67. Each of the locking pieces 67 include a base portion 68 arranged to extend from the base part 62, and a locking claw 68A provided at a tip end of the base portion 68. Each of the base portions 68 has a portion in the plate surface direction having a slim plate shape along the length direction of the base part 62, and is bendable along the short side direction of the base part 62 with a base end portion as a supporting point. The locking claws 68A are projected to outside in the short side direction of the base part 62 from each other from the tip ends of the locking pieces 67.

Further, at the positions corresponding to the back sides of the four clip parts 63 on the back surface side of the base part 62, projections 69 which respectively define ridge shapes along the short side direction of the base part 62 and are projected toward the back surface side are provided.

Meanwhile, on the back plate part 22 of the case 21, a locking part insertion hole 24, and a pair of locking piece insertion holes 25 (corresponding to locking holes of preferred embodiments of the present invention) which are provided with the locking part insertion hole 24 therebetween are respectively provided to correspond to the mounting position of the lamp clip 61 (see FIGS. 6 to 9). The locking part insertion hole 24 has a size that is substantially equal to the outside diameter of the positioning engagement part 66 in the lamp clip 61, so that the positioning engagement part 66 can be inserted substantially tightly.

The locking piece insertion hole 25 preferably has a slim shape along the length direction of the lamp clip 61. The width in the short length direction in the locking piece insertion hole 25 is set as the length matched with the mounting width in the short side direction of the central locking piece 67 and both the adjacent locking pieces 67 of a set of the locking pieces 67, and the locking claws 68A are locked to a hole edge 25A at the side of the long side in the locking piece insertion hole 25 from the back surface side, whereby the lamp clip 61 is fixed to the back plate part 22. Meanwhile, the length in the long side direction in the locking insertion hole 25 preferably has a small allowance with respect to the length of the side-by-side arrangement of the three locking pieces 67, and predetermined clearances C are set between edges at outer sides (sides opposite from the sides opposed to the central locking piece 67) in the locking pieces 67 at both end portions and hole edges 25B at the short length side in the locking piece insertion hole 25. The clearance C is set to be the maximum extension length or more of the lamp clip 61 when the temperature inside the backlight unit 20 rises to the highest temperature (for example, about 80° C.) in the case of normal use of the liquid crystal display 1.

Further, a mounting hole 33 is provided at the position which is matched with the locking part insertion hole 24 and the locking piece insertion holes 25 of the case 21, in the reflection sheet 31, so as to allow insertion of the positioning engagement part 66 and the locking pieces 67 of the lamp clip 61. The mounting hole 33 preferably has a substantially rectangular shape so as to be one size larger than the region where the positioning engagement part 66, the locking pieces 67 and the projections 69 are provided in the lamp clip 61, and one size smaller than the outer shape of the base part 62. The lamp clip 61 is arranged such that the positioning engagement part 66 and the locking pieces 67 pass through the mounting hole 33 and are inserted into the locking part insertion hole 24 and the locking piece insertion holes 25, respectively, and the projections 69 pass through the mounting hole 33 to be in close contact with the back plate part 22 of the case 21. In this state, the base part 62 overhangs above the peripheral region of the mounting hole 33 in the reflection sheet 31 in the state in which the base part 62 is slightly lifted and spaced from the reflection sheet 31.

The optical member 71 is mounted on the opening of the case 21 to cover the opening. The optical member 71 is preferably formed by overlaying a diffusing sheet 72, a lens sheet 73, an optical sheet 74 and a diffusing plate 75 in this sequence from the front surface side. Each of the sheets 72, 73, 74 and 75 preferably has a substantially rectangular shape and is substantially the same size as the liquid crystal panel 10, and is supported by the pins 65 of the lamp clip 61 from the back surface side. Rim-shaped frames 76 for mounting the optical member 71 are placed respectively on its front surface side and back surface side.

An inverter unit 91 and an external circuit unit 92 for performing a lighting control or the like of the cool cathode tubes 81 are mounted on the back surface of the case 21.

On assembling the liquid crystal display 1, the reflection sheet 31 is laid on the back plate part 22 of the case 21, and the positioning engagement part 66 and the locking pieces 67 of the lamp clip 61 are respectively inserted into the locking part insertion hole 24 and the locking piece insertion holes 25 from above the reflection sheet 31. Then, the locking claws 68A in the locking pieces 67 are locked to the hole edges 25A on the side of the long side in the locking piece insertion holes 25 from the back surface side, and thereby, the lamp clip 61 is fixed to the back plate part 22.

As aforementioned, errors may occur to the entire dimension or the position of the locking pieces 67 due to dimensional tolerance and the like at the time of manufacturing the lamp clip 61. Therefore, it is possible that a deviation occurs in the positional relationship of the positioning engagement part 66 and the locking pieces 67 and the locking part insertion hole 24 and the locking piece insertion holes 25, thus resulting in poor assembly of the lamp clip 61 to the back plate part 22. However, in the construction of preferred embodiments of the present invention, the length in the long side direction in the locking piece insertion hole 25 is formed to have a small allowance with respect to the side-by-side arrangement length of a set of the locking pieces 67, and the predetermined clearances C are set between the edge portions of the locking pieces 67 located at both ends and the hole edges 25A on the side of the short side in the locking piece insertion hole 25. Thereby, an error in the distances between the positioning engagement part 66 and both the adjacent locking pieces 67 with respect to the distances between the insertion hole 24 and both the adjacent locking piece insertion holes 25 is absorbed by the clearances C, and therefore, poor assembly of the lamp clip 61 to the back plate part 22 is reliably prevented.

After the lamp clips 61 are mounted, the cool cathode tubes 81 with the rubber holders 51 mounted to the end portions are arranged side by side in the case 21, and the tube bodies of the cool cathode tubes 81 are supported by the clip parts 63 of the lamp clips 61. Then, the lamp holders 41 are fitted to the case 21 to cover the rubber holders 51. Next, the optical member 71, the frames 76, the inverter unit 91 and the external circuit unit 92 are assembled to the case 21, and thereby, assembly of the backlight unit 20 is completed. Finally, the backlight unit 20 is assembled to the liquid crystal panel 10 from the back surface side of the liquid crystal panel 10, and fixed by the bezel 13, and thereby the liquid crystal display 1 is completed.

When using the liquid crystal display 1, the light emitted from the cool cathode tubes 81 provided at the backlight unit 20 is directly incident on the optical member 7, and the emitted light is also reflected by the reflection sheet 31 on the back surface side to be incident on the optical member 71, and thus emitted to the back surface side of the liquid crystal panel 10 in the state diffused by the optical member 71, and thereby, the display on the liquid crystal panel 10 is visually recognized. At this time, the temperature of the inside of the case 21 gradually rises due to heat generation of the cool cathode tubes 81, and with this, the lamp clip 61 and the case 21 thermally expand. In this case, the thermal expansion coefficient of the lamp clip 61 made of a resin is larger as compared with that of the case 21 made of metal, and therefore, the lamp clip expands and deforms more with respect to the case 21. On the other hand, in the cold season like winter, the lamp clip 61 and the case 21 contract due to reduction in the ambient temperature. In this case, the lamp clip 61 also contracts and deforms more with respect to the case 21 due to the difference in thermal expansion coefficient. Therefore, it is possible that the case 21 will not mimic the expansion and contraction of the lamp clip 61, and thus, will cause bending deformation or the like to the lamp clip 61, and can result in damage to liquid crystal display 1.

However, as described above, the length in the long side direction in the locking piece insertion hole 25 is arranged to have a little allowance with respect to the side-by-side arrangement length of a set of the locking pieces 67, and the predetermined clearances C are set between the edge portions of the locking pieces 67 located at both ends and the hole edges 25A at the side of the short side in the locking piece insertion hole 25. Accordingly, expansion and contraction deformation of the lamp clip 61 can be absorbed by the clearance C, and therefore, bending deformation and the like of the lamp clip 61 are reliably prevented.

The locking piece insertion hole 25 is preferably formed to have an allowance in the direction along the length direction of the lamp clip 61 with respect to the locking pieces 67, and the clearance C is set to allow relative displacement of the locking piece 67 in the direction along the length direction of the lamp clip 61. This reduces the influence of the dimensional change in the length direction on which influence of the dimensional tolerance and expansion and contraction becomes large as compared with the short side direction in the lamp clip 61, and this can more effectively prevent bending deformation and the like of the lamp clip 61.

Further, in the lamp clip 61, the positioning engagement part 66 for performing positioning with respect to the case 21 is provided at the center position in the surface opposed to the inner wall surface 22A of the case 21. Therefore, when the lamp clip 61 expands and contracts due to temperature change, the lamp clip 61 is fixed to the back plate part 22 in the central position by the positioning engagement part 66, and the locking pieces 67 relatively displace in the outside direction or the inside direction with respect to the positioning engagement part 66. The lamp clip 61 is positioned in its center position by the positioning engagement part 66 in this manner, and therefore, a variation of the fixed position of the lamp clip 61 to the case 21 is reliably prevented.

As described above, according to preferred embodiments of the present invention, the clearance C is set between the edge portion of the locking piece 67 in the lamp clip 61 and the hole edge 25A of the locking piece insertion hole 25, and thereby, relative displacement of the locking piece 67 in the locking piece insertion hole 25 is allowed. According to such a construction, expansion and contraction deformation of the lamp clip 61 due to temperature change, and variation in the molding accuracy can be absorbed, and therefore, poor assembly of the lamp clip 61 to the case 21 is reliably prevented.

The clearance C is set to allow the relative displacement of the locking piece 67 in the direction along the length direction of the lamp clip 61. This reduces influence of the dimensional change in the long side direction on which influence of the dimensional tolerance and expansion and contraction becomes large as compared with the short side direction in the lamp clip 61, and this can more effectively prevent bending deformation and the like of the lamp clip 61.

In addition, the lamp clip 61 is provided with the positioning engagement part 66 for performing positioning with respect to the case 21. According to such a construction, the mounting position of the lamp clip 61 is fixed by the positioning engagement part 66, and therefore, even when the locking piece 67 relatively displaces with respect to the back plate part 22 of the case 21 due to expansion and contraction due to temperature change, variation of the fixed position of the lamp clip 61 with respect to the case 21 is reliably prevented.

Next, another configuration of preferred embodiments of the present invention will be described in detail with reference to FIGS. 10 to 14.

Figure 10:
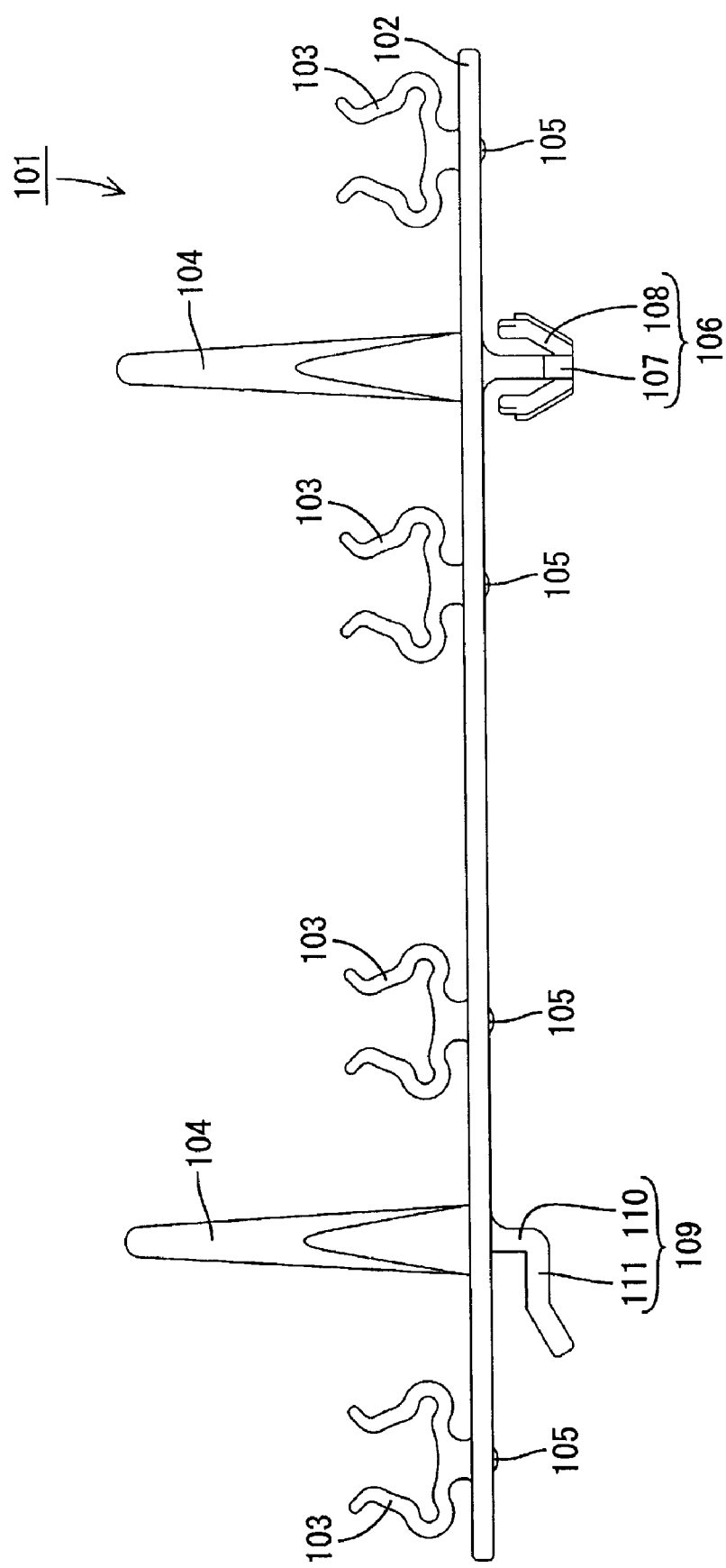
FIG. 10 is a side view of a lamp clip with a different configuration seen in a long side direction.
Figure 11:
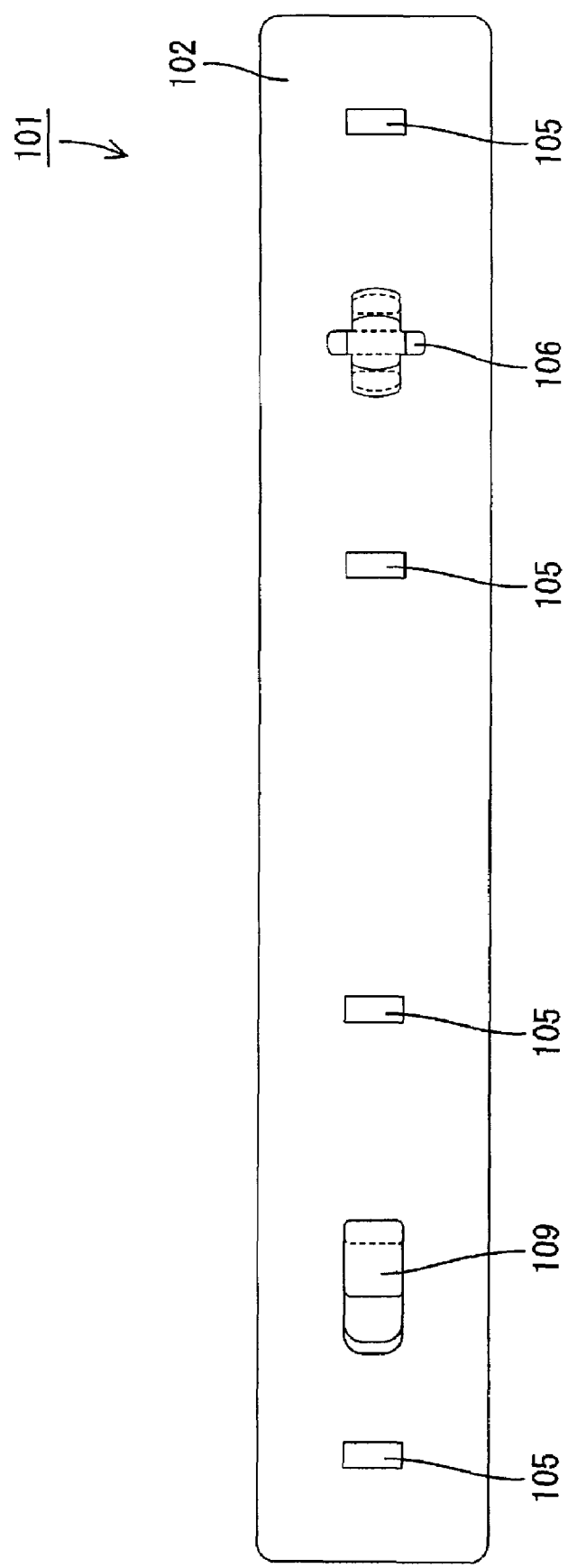
FIG. 11 is a rear view of the lamp clip of FIG. 10.
Figure 12:
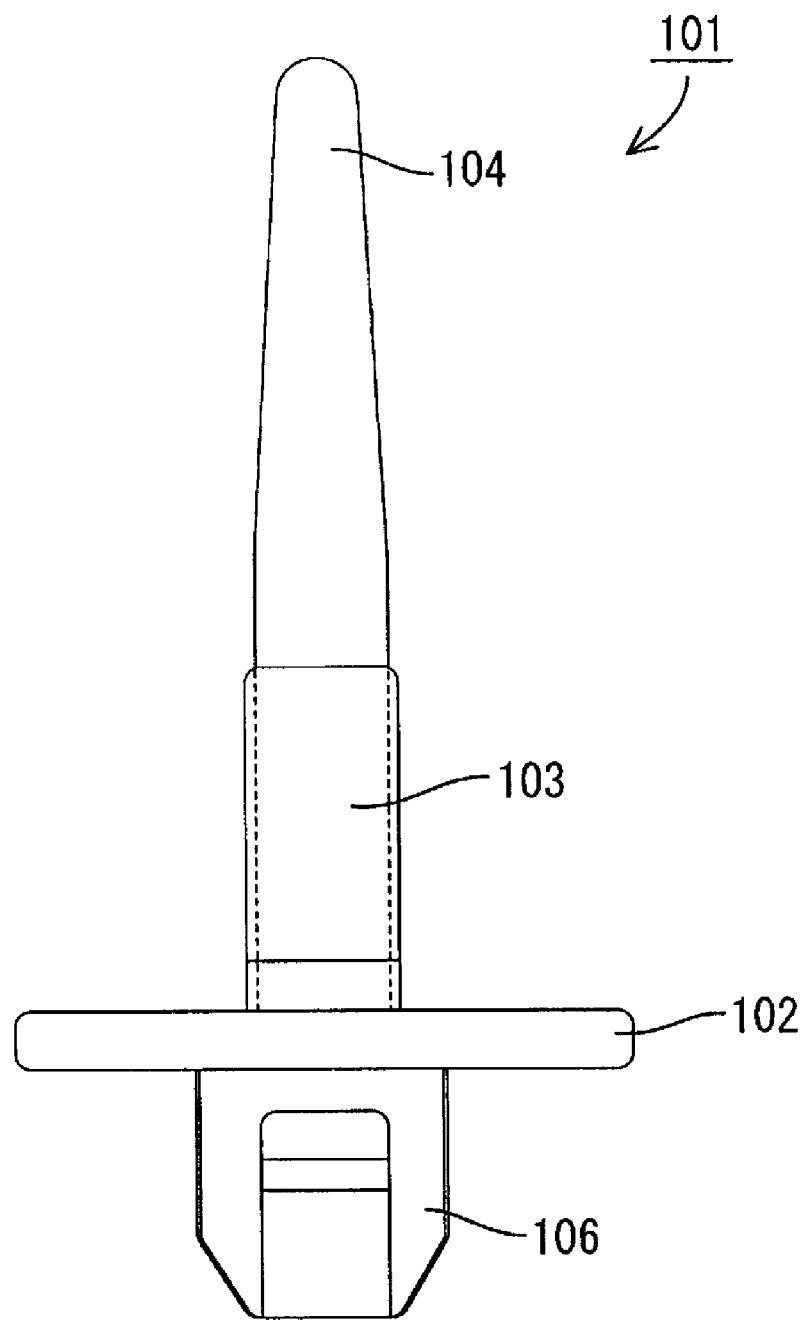
FIG. 12 is a side view of the lamp clip of FIG. 10 seen in a short side direction.

A lamp clip 101 of this configuration includes a base part 102 having a substantially rectangular plate shape as in the previous example structure, and clip parts 103, pins 104 and projections 105 having the same shapes as those in the previous example structure are provided on the front and back surfaces of the base part 102 (see FIGS. 10 to 12).

On a surface at a side opposite from a surface opposed to the back plate part 22 of the case 21 in the base part 102, a positioning engagement part 106 and a locking piece 109 are provided at the positions corresponding to back sides of the two pins 104. The positioning engagement part 106 is constructed by a base portion 107 arranged to protrude to the back surface side from the base part 102, and a pair of elastic locking claws 108 which are extended toward the base part 102 side, diagonally upward from the tip end portion of the base portion 107, namely, separating from the base portion 107. The plate surface of the base portion 107 is along the short side direction of the base part 102. Namely, its plate thickness direction is preferably substantially the same as the long side direction of the base part 102. Both the elastic locking claws 108 are formed into an open side and are connected to both side surfaces of the tip end portion of the base part 107, and are elastically deformable along the direction (long side direction of the base part 102) to contact and separate from the base portion 107 with their connecting portions as support points, with step portions 108A formed at tip ends (sides opposite from the connecting portions).

The locking piece 109 includes a connecting portion 110 having a plate shape configuration which is arranged to protrude from the base part 102 to the back surface side, and a bending piece 111 extending substantially parallel with the plate surface of the base part 102 in the outside direction from a tip end of the connecting portion 110, namely, in the direction away from the positioning engagement part 106. A tip end portion of the bending piece 111 is inclined diagonally in the direction extending away from the base part 102. The plate surface of the connecting portion 110 extends along the short side direction of the base part 102 as the base portion 107 of the positioning engagement part 106, namely, the plate thickness direction is the same as the long side direction of the base part 102.

Figure 13:
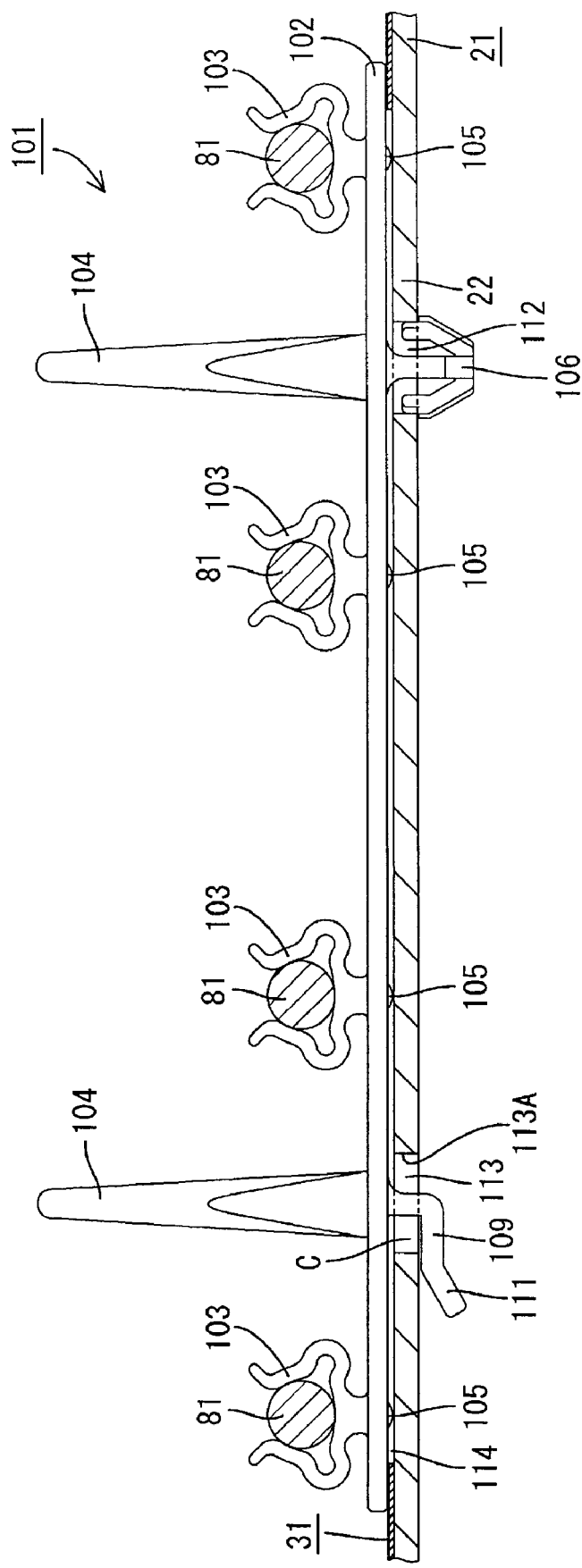
FIG. 13 is a sectional side view showing the lamp clip after being mounted to the case of FIG. 10.
Figure 14:
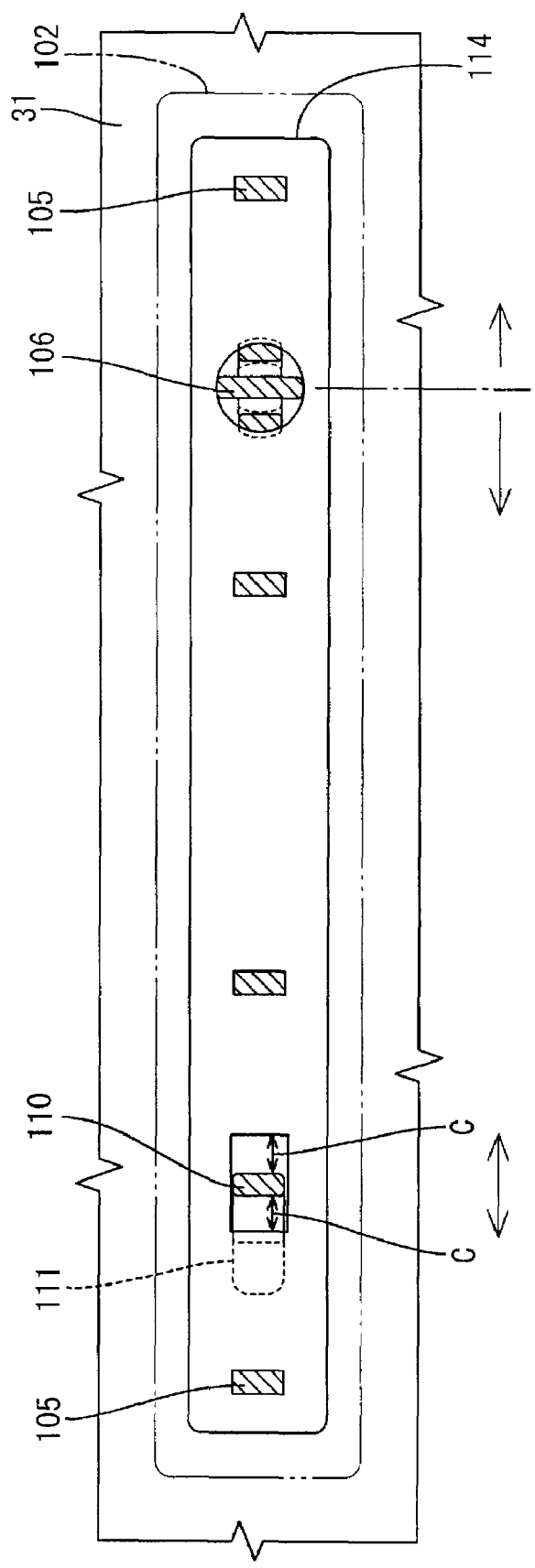
FIG. 14 is a rear view showing a state of expanding and contracting deformation of the lamp clip of FIG. 10.

Meanwhile, at the back plate part 22 of the case 21, a locking part insertion hole 112 and a locking piece insertion hole 113 are provided at the positions corresponding to the positioning engagement part 106 and the locking piece 109 in the mounting position of each of the lamp clips 101 (see FIGS. 13 and 14). Of them, the locking part insertion hole 112 corresponding to the positioning engagement part 106 is preferably substantially circular, its diameter being slightly large with respect to the width dimension of the base portion 107 of the positioning engagement part 106, and the base portion 107 is fitted in the locking part insertion hole 112 as shown in FIG. 14. The opening width of a pair of the elastic locking claws 108 corresponds to the diameter of the locking part insertion hole 112, and in the state in which the elastic engaging claws 108 slightly elastically deform in the direction to approach the base portion 107, step portions 108A engage with the opening edge of the locking part insertion hole 112.

Further, the locking piece insertion hole 113 corresponding to the locking piece 109 is slightly large with respect to the width dimension of the connecting portion 110 in the direction along the short length direction of the base part 102, and the connecting portion 110 is fitted into the locking piece insertion hole 113 as shown in FIG. 14. It forms a substantially rectangular shape with the length in the direction along the length direction having sufficient allowance with respect to the plate thickness of the connecting portion 110, and clearances C are formed at both sides of the connecting portion 110.

In addition, the reflection sheet 31 which is laid on the back plate part 22 is also provided with a mounting hole 114 at a mounting position of each lamp clip 101. The mounting hole 114 preferably has a substantially rectangular shape, and preferably has a perimeter that is larger than a region where the positioning engagement part 106, the locking piece 109 and the four projections 105 of the lamp clip 101 are formed, yet to have a perimeter that is smaller than a perimeter of the base part 102.

The construction of the other parts is preferably the same as the above-described disclosure as shown in FIGS. 1 to 9, and therefore, the explanation thereof will be omitted by assigning them the same reference numerals and characters.

When assembling the liquid crystal display of the present preferred embodiment, the reflection sheet 31 is laid on the back plate part 22 of the case 21 as described above, and the positioning engagement part 106 and the locking piece 109 of the lamp clip 101 are inserted into the locking part insertion hole 112 and the locking piece insertion hole 113 from above the reflection sheet 31, whereby the lamp clip 101 is fixed to the back plate part 22. At this time, while the base part 102 is inclined with respect to the back plate part 22 of the case 21, the inclined portion at the tip end in the locking piece 109 is inserted into the locking piece insertion hole 113 first, and the bending piece 111 is caused to advance to the back surface side of the base part 102. Subsequently, the base part 102 is slightly moved in the tip end direction of the bending piece 111 while the base part 102 is returned to the parallel posture with respect to the back plate part 22, and the positioning engagement part 106 is inserted into the locking part insertion hole 112.

When the lamp clip 101 is mounted to the back plate part 22, a step portion 108A provided at the tip end portion of the elastic locking claw 108 is locked against a peripheral edge of the back side in the locking part insertion hole 112, and the bending piece 111 in the locking piece 109 is locked against a peripheral edge of the back side in the locking piece insertion hole 113, whereby the lamp clip 101 is locked to the back plate part 22. At this time, the projections 105 of the lamp clip 61 abut the back plate part 22, and the base part 102 is positioned above the peripheral region of the mounting hole 114 in the reflection sheet 31, and further the base part 102 it is lifted from the bottom part 22 by the thickness of the projections 105, thereby pressing the reflection sheet 31.

Here, variations in the entire dimension and the positions of the positioning engagement part 106 and the locking piece 109 due to dimensional tolerance or the like at the time of manufacturing the lamp clip 101 can occur. Thus, variations occur to the distance between the positioning engagement part 106 and the locking piece 109, and the distance between the locking part insertion hole 112 and the locking piece insertion hole 113, which can result in a poor assembly of the lamp clip 101 to the back plate part 22. However, in the present preferred embodiment, the width in the direction along the long side direction of the base part 102 in the locking piece insertion hole 113 is formed to have a small allowance with respect to the plate thickness of the connecting part 110 in the locking piece 109, and a predetermined clearance C is set between a plate surface along a short side portion of the base part 102 in the connecting portion 110 and a hole edge 113A of the locking piece insertion hole 113. Thereby, an error in the distance between the positioning engagement part 106 and the locking piece 109 is absorbed by the clearance C, and therefore, poor assembly of the lamp clip 61 to the back plate part 22 is reliably avoided.

In the structure of this example of the present preferred embodiment, the positioning engagement part 106 and the locking piece 109 are provided respectively on the back sides of the two pins 104, and therefore, when they are inserted into the locking part insertion hole 112 and the locking piece insertion hole 113, the operation can be performed by holding each of the pins 104 directly above them, thus providing extremely favorable operability.

After the lamp clip 101 is mounted, the other members are assembled in sequence as described above, and the liquid crystal display is completed.

When using the liquid crystal display, light that is emitted from the cool cathode tubes 81 provided at the backlight unit 20 is directly incident on the optical member 71, and the emitted light is also reflected by the reflection sheet 31 on the back side to be incident on the optical member 71, and is emitted from the back surface side of the liquid crystal panel 10 in the state diffused by the optical member 71, and thereby, the display on the liquid crystal panel 10 is visually recognized.

At this time, the temperature of the inside of the case 21 gradually rises due to heat generation of the cool cathode tubes 81, and with this, the lamp clip 101 and the case 21 thermally expand. In this case, the thermal expansion coefficient of the lamp clip 101 made of a resin is larger than that of the case 21 made of metal, and therefore, the lamp clip 101 expands and deforms significantly with respect to the case 21. On the other hand, in the cold season like winter, the lamp clip 101 and the case 21 contract due to reduction in the ambient temperature. In this case, the lamp clip 101 also contracts and deforms significantly with respect to the case 21 due to the difference in thermal expansion coefficient. Therefore, the case 21 cannot mimic the expansion and contraction of the lamp clip 101, and therefore will cause bending deformation or the like to the lamp clip 101, which can result in damage to liquid crystal display 1.

However, as described above, in the locking piece insertion hole 113, the length dimension along the length direction of the base part 102 is formed to have sufficient allowance with respect to the connecting portion 110 of the locking piece 109, and the predetermined clearances C are set between the plate surfaces parallel with the short side portion of the base part 102 in the connecting portion 110, and the hole edges 113A of the locking piece insertion hole 113. Accordingly, a variation in the distance between the positioning engagement part 106 and the locking piece 109 resulting from expansion and contraction deformation of the lamp clip 101 can be absorbed by the clearances C, and therefore, bending deformation and the like of the lamp clip 101 is reliably avoided.

In the present configuration, the clearance C is also set to allow relative displacement of the locking piece 109 in the direction along the length direction of the lamp clip 101. This reduces the influence of the dimensional change in the long side direction on which influence of the dimensional tolerance and expansion becomes large as compared with the short side direction in the lamp clip 101, and can effectively prevent bending deformation and the like of the lamp clip 101.

Further, the clearances C are preferably provided only between the locking piece 109 and the locking piece insertion hole 113, and the large clearance C is preferably not set between the positioning engagement part 106 and the locking part insertion hole 112. Thereby, the positioning engagement part 106 also serves as a positioning part which performs positioning with respect to the back plate part 22. More specifically, even if the lamp clip 101 expands and contracts, and the locking piece 109 relatively displaces with respect to the back plate part 22, the relative position of the positioning engagement part 106 with respect to the back plate part 22 does not change, and therefore, variation in the fixing position of the lamp clip 101 to the case 21 can be prevented.

In addition, although in the above described construction of preferred embodiments of the present invention, the locking piece 67 is provided at the lamp clip 61, and the locking piece insertion hole 25 is provided in the case 21, it is contemplated that the locking piece may instead be arranged to protrude from the back plate part of the case, and the locking hole may be provided at the lamp clip.

Although in the above described construction of preferred embodiments of the present invention, the locking piece insertion hole 25 allows relative displacement of the locking piece 67 along the long side direction of the lamp clip 61, it is contemplated that the locking piece insertion piece 25 may allow relative displacement of the locking piece along the short side direction of the light source holding element. Also, the backlight unit 20 is not limited to the direct type in which the light source is disposed at the back surface side of the liquid crystal panel 10, the backlight unit 20 may be of an edge light type in which a light source is disposed at the side part of the display panel. Further, the present invention is not limited to the liquid crystal display, application of the present invention is not limited to liquid crystal display devices, and the present invention is applicable to any display device including a backlight device on the back surface side of the display panel.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A lighting device for a display device comprising:
    a light source;
    a casing having a back plate part, and accommodating said light source; and
    a light source holding element that is mounted to said back plate part of said casing and holds said light source;
    wherein the light source holding element includes:
        a base part extending along the back plate part of said casing;
        a pair of elastic pieces which are arranged to protrude at the base part and hold said light source;
        an engaging part which is arranged to protrude at said base part on a side opposite from said elastic pieces, penetrates through an engaging part insertion hole formed in the back plate part of said casing and engages with said back plate part; and
        a locking piece which is arranged to protrude at said base part on a side opposite from said elastic pieces, penetrates through a locking piece insertion hole formed in the back plate part of said casing, sandwiches said back plate part with said base part on a back side of the back plate part and is locked; wherein
    said locking piece insertion hole is larger than said locking piece, and clearances are provided between opening edge portions of the locking piece insertion hole and said locking piece.

2. The lighting device for a display device according to claim 1, wherein the base part of said light source holding element has a slim elongated shape, and said clearances extend in a direction along a length direction of said base part.

3. The lighting device for a display device according to claim 2, wherein said engaging part includes a base portion which has a plate shape arranged to protrude from said base part, and a pair of elastic engaging claws diagonally extending to said base part side from a tip end portion of the base portion.

4. The lighting device for a display device according to claim 3, wherein said engaging part insertion hole has a substantially circular shape, said base portion has a width dimension that is slightly smaller than a diameter of said engaging part insertion hole, and is fitted in said engaging part insertion hole.

5. The lighting device for a display device according to claim 4, wherein said elastic engaging claws are arranged side by side along the length direction of said base part.

6. The lighting device for a display device according to claim 5, wherein, on a surface of said base part where said engaging part and said locking piece are provided, projections are provided at intervals which abut the back plate part of said casing and bring said base part into a state where it is lifted and spaced from the back plate part.

7. The lighting device for a display device according to claim 1, wherein, on a surface of said base part where said elastic pieces are provided, pins which protrude to a position higher than said elastic pieces are arranged to correspond to positions where said engaging part and said locking piece are provided.

8. The lighting device for a display device according to claim 2, wherein, on a surface of said base part where said elastic pieces are provided, pins which protrude to a position higher than said elastic pieces are arranged to correspond to positions where said engaging part and said locking piece are provided.

9. The lighting device for a display device according to claim 1, wherein said light source holding element is made of a white or a semi-opaque synthetic resin.

10. The lighting device for a display device according to claim 1, wherein said light source holding element is made of a transparent synthetic resin.

11. A display device comprising:
    a display panel including the lighting device according to claim 1 which is provided on a back surface side of said display panel and arranged to light the display panel.

12. The display device according to claim 11, wherein said display panel is a liquid crystal panel which electrically controls a polarization property of light of liquid crystal.

13. A display device comprising:
    a liquid crystal panel which electrically controls a polarization property of light of liquid crystal;
    a lighting device which supplies light to the liquid crystal panel; and
    an optical sheet located between said liquid crystal panel and said lighting device for the display device; wherein
    said lighting device for the display device includes:
        a light source;
        a casing which has a back plate part and accommodates said light source;
        a light source holding element which is mounted to said back plate part of said casing and holds said light source; wherein
        the light source holding element includes:
            a base part which extends along the back plate part of said casing;
            a pair of elastic pieces which are arranged to protrude at the base part and hold said light source;
            an engaging part which is arranged to protrude at said base part on a side opposite from said elastic pieces, penetrates through an engaging part insertion hole formed in the back plate part of said casing, and engages with said back plate part; and a locking piece which is arranged to protrude at said base part on a side opposite from said elastic pieces, penetrates through a locking piece insertion hole formed in the back plate part of said casing, sandwiches said back plate part with said base part on a back side of said back plate part, and is locked; wherein said locking piece insertion hole is larger than said locking piece and clearances are provided between an opening edge portions of the locking piece insertion hole and said locking piece; and on a surface of said base part where said elastic pieces are provided, pins which protrude to a position in contact with said optical sheet are arranged to correspond to positions where said engaging part and said locking piece are located.

14. The display device according to claim 13, wherein the base part of said light source holding element has a slim elongated shape, and said clearances extend in a direction along a length direction of said base part.

15. The display device according to claim 14, wherein said engaging part includes a base portion which has a plate shape arranged to protrude from said base part, and a pair of elastic engaging claws diagonally extending to said base part side from a tip end portion of the base portion.

16. The display device according to claim 15, wherein said engaging part insertion hole has a substantially circular shape, said base portion has a width dimension that is slightly smaller than a diameter of said engaging part insertion hole, and is fitted in said engaging part insertion hole.

17. The display device according to claim 16, wherein said elastic engaging claws are arranged side by side along the length direction of said base part.

18. The display device according to claim 13, wherein, on a surface of said base part where said elastic pieces are provided, pins which protrude to a position higher than said elastic pieces are arranged to correspond to positions where said engaging part and said locking piece are provided.

* * * * *